United States Patent [19]

Magario

[11] Patent Number: 5,301,120
[45] Date of Patent: Apr. 5, 1994

[54] METHOD OF COLLECTING DATA OF A GROUP OF INJECTION MOLDING MACHINES

[75] Inventor: Takashi Magario, Nagano, Japan

[73] Assignee: Nissei Plastic Industrial Co., Ltd., Nagano, Japan

[21] Appl. No.: 913,362

[22] Filed: Jul. 19, 1992

[30] Foreign Application Priority Data

Jul. 23, 1991 [JP] Japan .................. 3-207355

[51] Int. Cl.$^5$ .............................................. G06F 15/46
[52] U.S. Cl. ..................................... 364/476; 364/138; 364/552; 264/40.1; 425/135
[58] Field of Search ............... 364/138, 178, 179, 473, 364/476, 552; 264/40.1, 40.7; 425/135, 144, 145, 162, 166, 169

[56] References Cited

U.S. PATENT DOCUMENTS 3,760,251  9/1973  Posl et al. ............................ 364/138
5,016,184  5/1991  Gutjahr ................................ 364/476
5,216,617  6/1993  Kamiguchi et al. ................. 364/476

FOREIGN PATENT DOCUMENTS 2-143825  6/1992  Japan .

*Primary Examiner*—Jerry Smith
*Assistant Examiner*—Steven R. Garland

[57] ABSTRACT

When collecting data in connection with operational physical values from a plurality of injection molding machines by means of a direct numerical control computer system incorporated in an LAN, for example, when collecting a quality control data, the direct numerical control computer system is allowed to specify a collection starting time and a collection terminating time of the data for the respective injection molding machines. With reference to the condition thus specified the data is communicated to the direct numerical control computer system from the respective injection molding machines.

4 Claims, 3 Drawing Sheets

METHOD OF COLLECTING DATA OF A GROUP OF INJECTION MOLDING MACHINES

BACKGROUND OF THE INVENTION

1. Field of the Invention

The present invention relates to a method of collecting data with respect to a group of injection molding machines which is suitably used in factories or the like equipped with a plurality of injection molding machines.

2. Description of the Relevant Art

Conventional factories equipped with a plurality of injection molding machines have an arrangement wherein LAN (local area network) systems are established, a collection is made by a direct numerical control computer system for various data with respect to an operational physical value of each injection molding machine, in particular, for data in connection with the pressure, velocity, temperature, time and the like each affecting a quality of an injection molding product. The collected data is operated to produce statistic values such as an average value, a maximum value, a minimum value, a variance and a range, based on which a quality control is performed. The systems of these kinds are known in the Japanese Patent Application Laid Open No. 143825/1990.

A method of collecting data using such LAN systems is in that various data detected from respective injection molding machines at every cycle (at every shot) have been transmitted to a direct numerical control computer system through a transmission line in real time, concurrently the direct numerical control computer receives such data to display the data for every injection molding machine or to perform filing them on a disk. Depending on a requirement, the data filed on the disk have been executed a statistic processing with respect to the injection molding machine and the database formation processing for a quality control and so forth so that the filed data are output as a substantial quality data of the injection molding together with a history of the injection molding process etc. This enables to collect information for a plurality of injection molding machines in real time, to obtain a large amount of data by realizing a higher capacity and an upgraded characteristic each of the computer memory, and to perform a complex processing on analysis and evaluation of the collected data. A quality control procedure in this case is thus graded up to ensure and facilitate the direct numerical control. In the LAN system, because a relatively more separated distance is required between the respective injection molding machines or between the direct numerical control computer system and the injection molding machine, then in general there are employed an optical communication system using optical fiber cables, a current loop system using electrical wire, and a radio communication system by a microwave, and due to the extended communication distance there is further employed a serial communication interfaces such as RS232C and RS422 each capable of reliably producing the data at a relatively lower cost.

The data in connection with the operational physical values of the molding machine used for the quality control include an injection primary pressure time, a measurement time, a screw position at the instant when the injection terminates, a cycle time and so forth, the number of those items described being relatively small (equal to ten items or below), however, the number of the items have now increased to twenty or more as a result of gradually fractionating due to a high grade of the quality control procedure. In addition, each of respective injection molding machines providing different products requires a different analysis from each other on a quality control therefor.

In this way, where the kinds of data to be communicated are increased to as many as twenty items, 128 bytes are required for transmission data including a transmission control code and command, a communication error control command and the like. Further, the transmission data of each injection molding machine incorporated into the LAN system is expanded to many divergences, for example, in addition, to a production control data, a status data of the injection molding machine, and an error generating data. This indicates a considerably large amount of data as a whole. With the serial communication interfaces used as described above, communication speeds of 4800 bps to 9600 bps are generally adopted, and therefore only a communication in the order of about 480 bytes to 960 bytes per second is available, or may be less in consideration of the processing time of the control devices with respect to the direct numerical control computer system and the respective injection molding machines.

The number of injection molding machines under the direct numerical control reaches generally at least to approximately ten sets, and not a few of injection molding machines with 3 to 4 second-cycles are produced by means of cycling up the machines.

As described above, when communicating the data including as many as twenty items at every cycle, a capability of the conventional method of data collection has been limited and resulted in a possibility to generate a cycle omission (dislocation of a cycle) because of difficulty to follow such a service speed in the data communication. The use of a particular communication dedicated device and a communication protocol, for example, Ethernet or the like having a communication speed of 10 mega-bps, are considered for the higher communication speed; however, it can not be employed in a practical use because of a considerably high cost.

SUMMARY OF THE INVENTION

An object of the present invention is to provide a method of reliably collecting data in connection with pressure, velocity, temperature, time and the like in each injection molding machine even when utilizing an economical general-use computer.

Another object of the invention is to provide a method of collecting data of a group of injection molding machines capable of upgrading stability and reliability on a quality control.

To achieve the foregoing object, a method of collecting data of a plurality of injection molding machines according to the invention, collects the data in connection with operational physical values, for example, a quality control data obtained from a group of injection molding machines M1, M2, M3, ... Mn by means of a direct numerical control computer system H incorporated in an LAN system S, wherein the method provides specifying a collection starting time and a collection terminating time for each of the respective injection molding machines M1 ... by means of a direct numerical control computer system H, and provides communicating the data to the direct numerical control computer system H from the respective injection molding machines M1 . . . in accordance with the specified condition. In this arrangement, a kind of data to be collected and/or a sampling interval for collecting the data, for example, the interval based on the number of molding shots, are previously set by the direct numerical control computer system H.

In this manner, a starting instruction for instructing the communication starting time is generated by means of the direct numerical control computer system H which includes a display and the like for displaying a keyboard and a screen for selection. Concurrently, when generating the terminating instruction for instructing the communication terminating time, only the data of those specified molding machines M1 . . . can be communicated to the direct numerical control computer system H through the LAN system S within the specified data collection time. The kind of data to be collected is set and the sampling interval used for collecting data, for example, the interval based on the number of molding shots is also set respectively by the direct numerical control computer system H, so that it is possible to select a required data at every unit basis of molding machines M1 - and to communicate at a required communication interval.

In general, in comparison of the production control with the quality control with respect to the injection molding machine, the production control is always required to be controlled. To the contrary, for the quality control, a periodical or non-periodical control required by supervising processes may be enough to achieve the foregoing quality control other than at the starting time of the molding machine. Therefore, even when setting a specified period for data collection and a specified kind of data, a collection of the satisfactory amount of data is available on the quality control and the amount of communication data is largely reduced due to exclusion of redundant data.

BRIEF DESCRIPTION OF THE DRAWING

The foregoing and other objects of this invention will be apparent from the description of the preferred embodiments with reference to the accompanying drawings, in which.

DETAILED DESCRIPTION OF THE PREFERRED EMBODIMENTS

The invention will now be described in detail in accordance with the preferred embodiments with reference to the accompanying drawings as follows.

Figure 2:
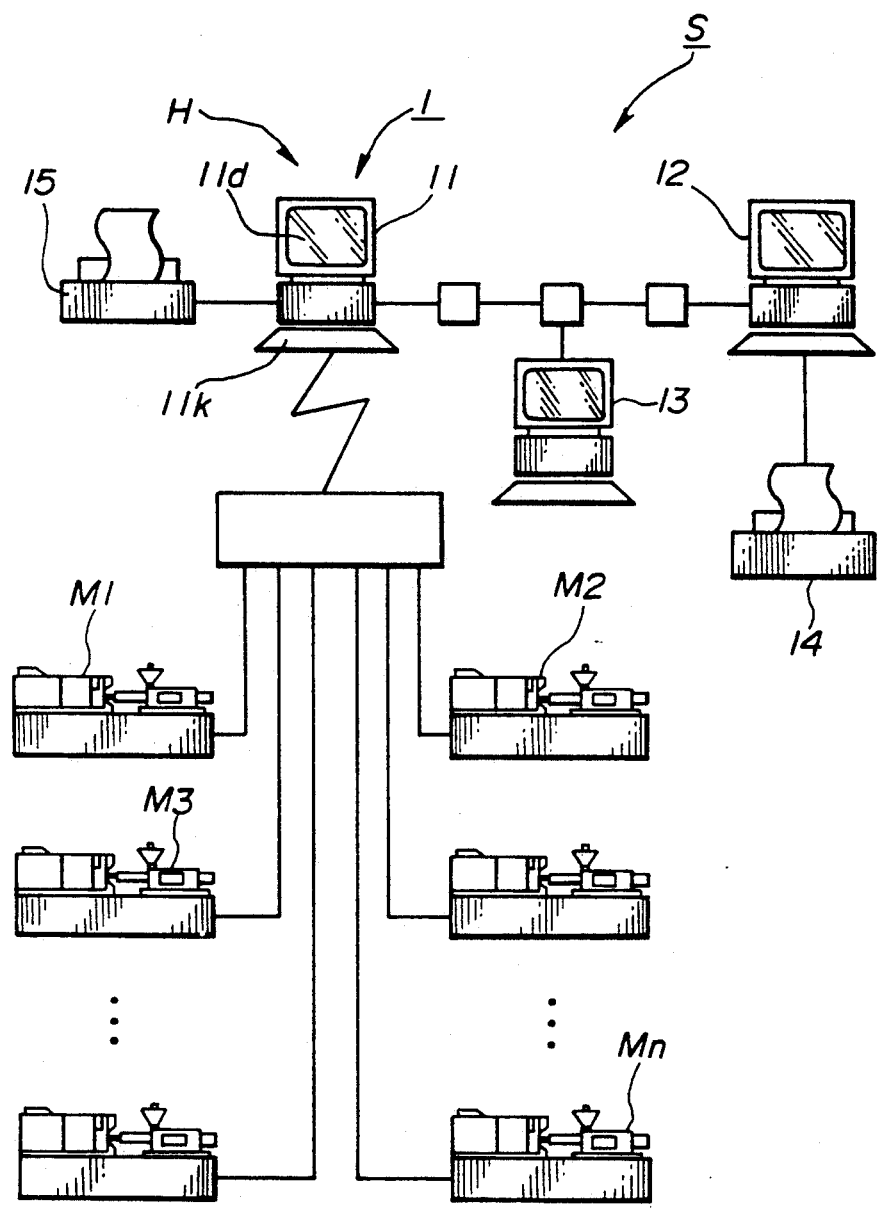
FIG. 2 is a connection diagram of an LAN system including a data collection device used for executing the method of collecting the data.

First, an LAN system S including a data collection device used in accordance with a method of collecting the data of a group of injection molding machines is explained in detail for its constitution referring to FIG. 2.

The LAN system S includes a plurality of injection molding machines M1, M2, M3, . . . Mn, which are installed in an injection molding factory.

Each molding machine of M1 . . . includes interface having an optical communicating function, and is connected to a direct numerical control computer system H through optical fiber cables. The direct numerical control computer system H is connected to three personal computers: namely, an on-line processing computer 11 which is connected to the respective molding machines M1 . . . through both of the optical interfaces and the optical fiber cables from RS-232C communication circuit, and which has functions, e.g., to communicate always on-line with the respective molding machines M1 . . . at a communication speed of 9600 bps, to collect the data like status data, production data and quality data, and to transmit a production plan and a molding setting condition to the respective molding machines M1 . . . ; an off-line processing computer 12 for performing an off-line processing such as a production control and a quality control processing, or a production planning and the molding condition setting process, based on the data collected by the on-line processing computer 11; and a server computer 13 for filing the data collected at the on-line processing computer 11 or the data set at the off-line processing computer 12.

Furthermore, the off-line processing computer 12 includes a printer 14 for outputting the respective processing data and the setting data, the on-line processing computer 11 includes a status output dedicated printer 15 for outputting molding process status data collected from the respective molding machines M1 . . . through the communication circuit.

The direct numerical control computer system H in this case is installed in a supervisory center provided in another room separated from the injection molding factory. A communication system between the respective molding machines M1 . . . and the direct numerical control computer system H employs a polling method.

The on-line processing computer 11 incorporates a data collecting device 1. More specifically, the on-line processing computer 11 is comprised of a communication start instructing functional section for instructing a communication start of data for the respective molding machines M1 . . . , a communication termination instructing functional section for instructing a termination of data communication, a data setting functional section for setting kinds of data to be collected, and a sampling interval setting functional section for setting a sampling interval used for collecting the data. The sampling interval described above is set based on the number of molding shots. The respective functional sections for executing the instructions and settings are executed by means of software. Practically, a screen for selection is displayed on a display (CRT) 11d of the on-line processing computer 11, the control is performed for selecting from a displayed screen by operating a cursor key of a keyboard 11k, and a specified data are reverse displayed and specified (set) by depressing a return key.

Figure 1:
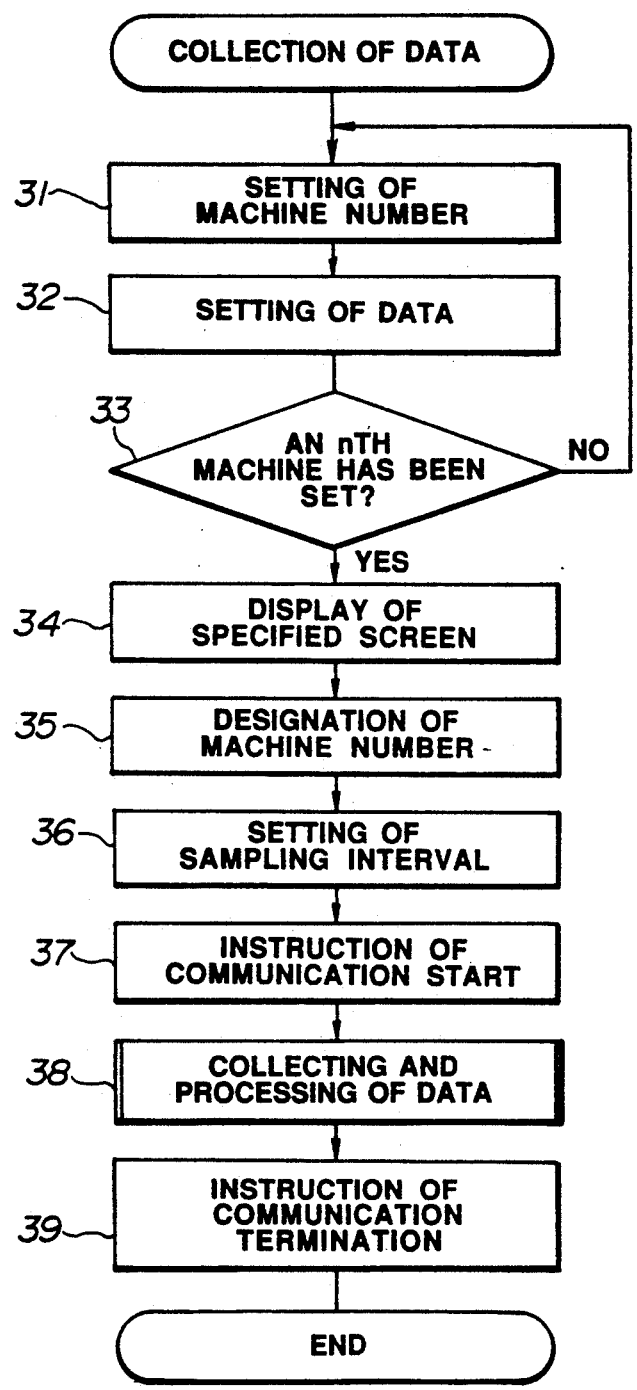
FIG. 1 is a flowchart showing a method of collecting data according to the invention.

The method of collecting the data of a group of injection molding machines according to the invention will be described with reference to FIG. 1 as follows.

First, the control will be performed for previously setting a condition of collecting data. In this case, the screen for selection used for specifying a machine number is displayed on the display 11d of the on-line processing computer 11. For collecting the data, the control is performed to designate the machine number of the molding machine M1 . . . by the cursor displayed on the picture through operating the cursor key of the keyboard 11k (step 31).

Upon completion of selecting the machine number, the screen for selection for specifying the data is displayed on the display 11d, and the control is performed for selecting the data to be collected by means of operating the cursor key (step 32). The data in the above, which are used for the quality control in connection with operational physical values of the molding machines M1 . . . , are selectably optionally determined with the number of one or more than two by selecting from among more than twenty items such as "cycle time", "injection primary pressure time", "measurement time", "injection start position", "injection most advanced position", "injection termination position", "measurement start position" and so forth. The setting process is terminated by depressing an ESC key after the termination of the data specifying process, the number of the specified data is transmitted to those designated of the indicated molding machines M1 . . . and registered in the on-line processing computer 11. The setting described above can sequentially be performed for the respective molding machines M1 . . . which necessitate the collection of the data, the number of the machines to be set being optionally selected (step 33).

On the other hand, when starting a data collection a specified screen used for the start thereof is displayed on the display (step 34). The control is performed to designate the machine numbers of the molding machines M1 . . . to be started by operating the keyboard (step 35) and to specify a sampling interval (step 36). After the operation above, by depressing a start key the sampling interval specifying data and the starting instruction are transmitted to the specified molding machines M1 . . . (step 37). In this control, for example, if data at every cycle (at every molding shot) is required, it may preferably be specified by "0", and if "1" is designated, the sampling interval becomes equal to that of a one-cycle thinning therefor.

The molding machines M1 . . . which have received the starting instruction, transmits the detected data to the direct numerical control computer system H with reference to the sampling interval. The direct numerical control computer system H files the received data in a disk (step 38).

To terminate the collecting process of the data the control is performed to designate the machine number on the specified screen for termination and to thereafter depress an enter key. Thereby, the terminating instruction is transmitted to those specified of molding machines M1 . . . to terminate the data collecting process (step 39).

Figure 3:
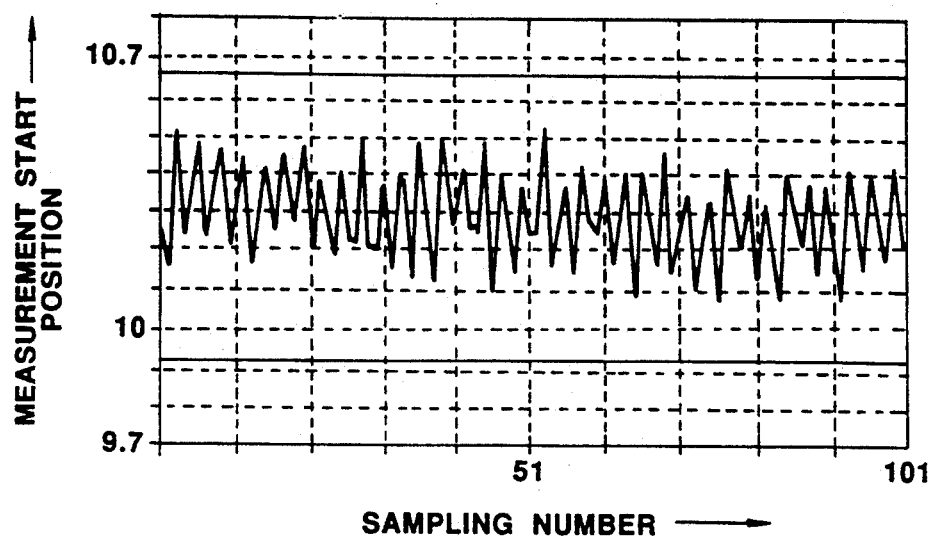
FIG. 3 is a graphical representation based on the collected data.
Figure 4:
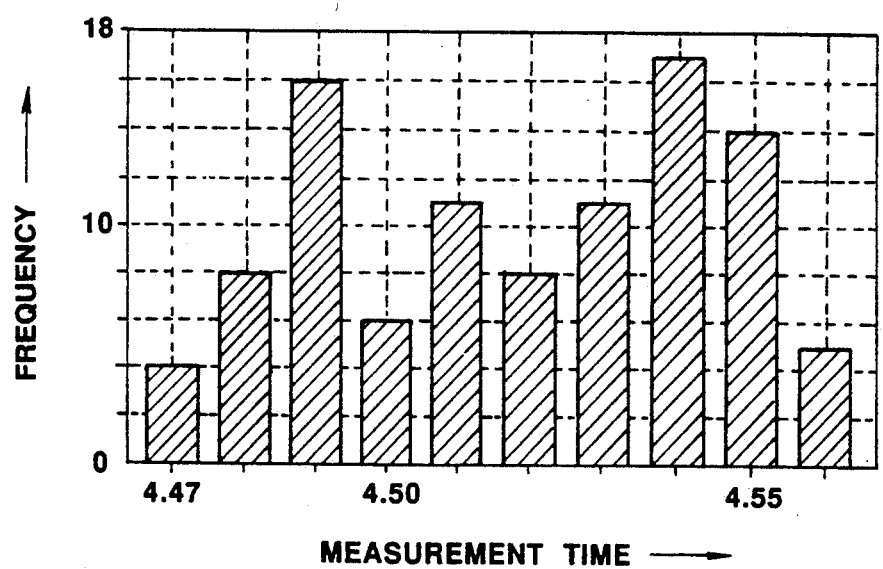
FIG. 4 is another graphical representation based on the collected data.

In this manner, a collection of a required quality control data at every unit basis of respective molding machines M1 . . . can be selectably performed to thereby exclude a redundant data, the amount of communication data can thus be largely reduced. FIG. 3 is a graphical representation in time series distribution showing measurement start position data based on the data thus collected, FIG. 4 is a histogram representing a frequency distribution for analyzing an average value or a variance state each of the measurement time, where sufficient data can be collected for the analysis. In addition, this data can be used for a numerical process like a multivariate analysis or for a database like an AI.

As hereinbefore fully shown and described with reference to the preferred embodiments, notwithstanding, the present invention is not limited to any of such embodiments in this specification, but the foregoing and other modifications and changes in the detailed form and method therefor can be made therein without departing from the sprit and scope of the present invention.

What is claimed is:

1. A method of collecting data of a group of injection molding machines for collecting data in connection with operational physical values from a plurality of injection molding machines by means of a direct numerical control computer system incorporated in an LAN system,
    a method of collecting data of a group of injection molding machines comprising of steps of,
    selectively specifying a collection starting time and a collection terminating time of data for the respective injection molding machines by means of a direct numerical control computer system, and
    responsive to the specifying step, communicating the data to the direct numerical control computer system from the respective injection molding machines in accordance with a specified condition.

2. A method of collecting data of a group of injection molding machines as claimed in claim 1, wherein the data is a data for a quality control.

3. A method of collecting data of a group of injection molding machines as claimed in claim 1, wherein a kind of data to be collected and/or a sampling interval for collecting the data are previously set by the direct numerical control computer system.

4. A method of collecting data of a group of injection molding machines as claimed in claim 3, wherein the sampling interval is set based on a number of molding shots.

* * * * *